(12) United States Patent
Truss

(10) Patent No.: US 7,784,221 B2
(45) Date of Patent: *Aug. 31, 2010

(54) FIRE COLLAR

(75) Inventor: James Walter George Truss, Thorneside (AU)

(73) Assignee: IG6 Pty Ltd, Queensland (AU)

( * ) Notice: Subject to any disclaimer, the term of this patent is extended or adjusted under 35 U.S.C. 154(b) by 679 days.

This patent is subject to a terminal disclaimer.

(21) Appl. No.: 11/664,070

(22) PCT Filed: Sep. 26, 2005

(86) PCT No.: PCT/AU2005/001477

§ 371 (c)(1), (2), (4) Date: Mar. 26, 2007

(87) PCT Pub. No.: WO2006/034534

PCT Pub. Date: Apr. 6, 2006

(65) Prior Publication Data

US 2008/0092467 A1    Apr. 24, 2008

(30) Foreign Application Priority Data

Sep. 27, 2004   (AU) .............................. 2004905546

(51) Int. Cl.
| E04H 9/00 | (2006.01) |
| E04C 2/52 | (2006.01) |
| E04C 2/00 | (2006.01) |
| F16K 17/40 | (2006.01) |

(52) U.S. Cl. ............................. 52/1; 52/232; 52/220.8; 137/75

(58) Field of Classification Search ...................... 52/1, 52/232, 220.8, 317; 137/75, 76, 77
See application file for complete search history.

(56) References Cited

U.S. PATENT DOCUMENTS

| 4,559,745 | A  | * | 12/1985 | Wexler   | ..... | 52/1   |
| 6,161,564 | A  | * | 12/2000 | Cornwall | ..... | 137/75 |
| 6,959,719 | B2 | * | 11/2005 | Truss    | ..... | 137/72 |
| 7,290,556 | B2 | * | 11/2007 | Truss    | ..... | 137/72 |

FOREIGN PATENT DOCUMENTS

| DE | 19600369 | 1/1997 |
| DE | 19842100 | 3/2000 |
| DE | 10043430 | 3/2002 |
| WO | WO 2004/072530 A1 | 8/2004 |

OTHER PUBLICATIONS

Int'l Search Report, Nov. 4, 2005

* cited by examiner

*Primary Examiner*—Richard E Chilcot, Jr.
*Assistant Examiner*—Chi Q Nguyen
(74) *Attorney, Agent, or Firm*—Abelman, Frayne & Schwab

(57) ABSTRACT

A fire collar (10) including a housing defining an opening (18) and a passage (20) adapted to receive a conduit therethrough. A layer of intumescent material (43) surrounds the conduit and is supported by the housing adjacent the opening. Torsion springs (34) are mounted between the housing and the intumescent material to surround the conduit and are held in a non-operational position by fusible links (41). When the heat of a fire melts the links, each torsion spring acts in a longitudinal plane of the passage to assist the intumescent material to collapse the conduit and seal the passage against advancement of the fire.

17 Claims, 11 Drawing Sheets

FIRE COLLAR

TECHNICAL FIELD OF THE INVENTION

This invention relates to fire collars.

Fire collars are typically used for preventing fire spreading from one side of a wall or floor to the other side via a penetration through which pipes, ducts or other service carriers pass.

Possibly one of the more important uses of fire collars is with conduits, particularly pipes and ducts, which are formed from plastics materials, for example, PVC and HDPE, but they are also used with rubber based materials, deformable metals and various composite materials.

BACKGROUND

One known type of fire collar comprises a metal collar having a liner of an intumescent material which is adapted to be fastened to a barrier, for example, a concrete wall or floor, around a conduit penetrating the barrier. In the event of a fire on one side of the barrier, the intumescent material expands upon its temperature reaching a predetermined level which in turn forces the conduit to collapse or pinches it off thereby inhibiting the spread of fire from one side of the barrier to the other. Examples of such fire collars are described in U.S. Pat. Nos. 058,346 and 347,767. Another form of fire collar relies on the heat from the fire to melt the conduit adjacent the point of penetration and cause the intumescent material to expand across the void left by the melted conduit thereby closing it.

One problem with prior art fire collars is that the time taken for the intumescent material to seal off the void left by a melted conduit can be too long in rapidly advancing fires which may result in fire or poisonous gases penetrating the barrier. That problem has been significantly reduced by the fire collar described in International Patent application No. PCT/AU2004/000143 (International Publication No. WO 2004/072530) by the present applicant. The fire collar described in that application has two opposed torsion springs and a sleeve of intumescent material mounted in a frame such that the frame can be mounted to a barrier and the sleeve fitted about a conduit passing through the barrier whereby the tail of each spring is adapted to engage with the sleeve which in turn engages with the conduit in response to fusing of respective retaining links holding the spring tails in the loaded position. While that fire collar is effective in use, it is more expensive to produce than is desirable.

SUMMARY OF THE INVENTION

With the foregoing in view, the present invention resides broadly in a fire collar including:

a mounting defining an opening adapted to receive a conduit therethrough;

a layer of intumescent material supported by said mounting adjacent said opening;

actuating means operatively connected to said mounting for movement from a non-operating mode proximal to said layer of intumescent material to an operating mode in which it moves in a longitudinal plane through said opening relative to the conduit to force at least a portion of said layer of intumescent material to at least partially obstruct said opening in response to the temperature reaching a predetermined level.

In another aspect, the invention resides broadly in a fire collar including:

a mounting defining an opening adapted to receive a conduit therethrough;

one or more segments of intumescent material arranged about said opening and being supported at one end by said mounting;

actuating means operatively connected to said mounting for movement from a non-operating mode to an operating mode in which said one or more segments of intumescent material are forced from their other ends to at least partially obstruct said passage in response to the temperature reaching a predetermined level.

In another aspect, the invention resides broadly in a fire collar including:

a mounting defining an opening adapted to receive a conduit therethrough;

a plurality of actuating means operatively connected to said mounting about said opening, each actuating means being in a non-operating position and being adapted to move in a generally longitudinal plane relative to the conduit to an operating position in response to the temperature reaching a predetermined level;

one or more segments or layers of intumescent material arranged about said opening within said plurality of actuating means and said plurality of actuating means being adapted to force said one or more segments or layers of intumescent material to at least partially obstruct said opening when in said operating position.

Preferably, said mounting is a housing adapted to house a layer of intumescent material therein and to receive a conduit therethrough and said layer of intumescent material is housed in said housing and adapted to at least partially form a sleeve about a conduit passing through said housing.

Preferably, the or each said actuating means includes a contactor which is adapted to move in a plane extending longitudinally through the opening relative to the conduit and to engage (directly or indirectly) the outer face of the layer or segment of intumescent material. It is also preferred that the contactor move in a plane containing the longitudinal axis of the conduit or a plane close to that plane. It is also preferred that the contactor be elongate in form and makes contact with the intumescent material over a substantial longitudinal distance relative to the conduit thus being positioned to force a substantial portion of the material into an obstructing position over the passage.

Preferably, each actuating means is a torsion spring which is mounted to the mounting with the tail restrained in the non-operating position by a fusible link and upon release the tail is arranged to engage the external face of the intumescent material and force it at least partially across the opening. In one such form, the axis of the torsion spring is parallel to a tangent to the outer surface of the conduit passing through the opening in the case of a cylindrical conduit and parallel to a side wall of the conduit in the case of a polygonal conduit. Typically, the fusible link is formed from a plastics material which softens to a fusible state upon the ambient temperature reaching a predetermined "high" temperature at which the spring causes it to break. In such form, the fusible link holds the tail of the spring in the "loaded" position, that is in a position with the spring wound sufficiently to apply a suitable force on the intumescent material.

In one form, the invention include two sets of actuating means, one set being adapted to engage the layer of intumescent material from one end and the other set being adapted to engage the intumescent material from the other end. Advantageously, such arrangement provides for more effective operation in some cases, particularly in cases where hot gases could originate on either side of a wall.

Preferably, a layer of protective material extends about the layer or segment of intumescent material to protect it from damage by the actuation means as it softens pursuant to an increase in temperature. Thus, reference to engagement of the intumescent material by the actuating means is to be understood as encompassing engagement with a layer of other material which might by interposed between the actuation means and the intumescent material, for example a layer of stainless steel gauze or fibreglass cloth.

Preferably, the layer of intumescent material is generally cylindrical in form and arranged to closely fit around the conduit which is to pass therethrough. In such form, it is preferred that the collar also include retaining means for retaining the cylindrical layer at one end in position or alternatively that it be secured to said mounting or said housing and be free at the other end whereby the actuating means can force the layer to collapse over the passage from the free end. If desired, the layer of intumescent material may be constituted by a plurality of layers.

In yet another aspect the invention resides broadly in a fire collar adapted to be located in or against a barrier and having a passage therethrough and being adapted to respond to a fire by sealing said passage, said fire collar including actuation means located around said passage and having intumescent material between said actuation means and said passage, said actuation means being held in a first position by heat actuated holding means such that when a predetermined temperature is reached as a result of a fire, said actuation means is released and applies a force to said intumescent material having a component along the passage thereby pushing it towards the center of said passage to obstruct said passage.

In another aspect the invention resides broadly in a fire collar adapted to be set into a concrete barrier during formation of the barrier, including:

a housing having a passage or cavity adapted to receive a conduit;

a quantity of intumescent material in said housing adjacent said passage or cavity;

one or more torsion springs adjacent said passage or cavity and adapted to engage said intumescent material upon the ambient temperature reaching a predetermined level, said one or more torsion springs being arranged to apply a force to said intumescent material having a component along the passage or into the cavity.

The terms "upper", "lower", "side" and similar terms are used herein for the purposes of describing the invention in its normal in use position in a building floor unless the contact clearly indicates another meaning and are not intended to limit the invention to use in any particular orientation and it is to be understood that the invention could be used in floors, walls, ceilings and other barriers of various types and orientations. It is also to be understood that the term "longitudinal" used herein refers to the direction of a conduit as it passes through a fire collar according to the invention unless the contact clearly indicates another meaning.

BRIEF DESCRIPTION OF THE DRAWINGS

In order that the invention may be more easily understood and put into practical effect, reference will now be made to the accompanying drawings wherein.

DETAILED DESCRIPTION OF THE DRAWINGS

Figure 1:
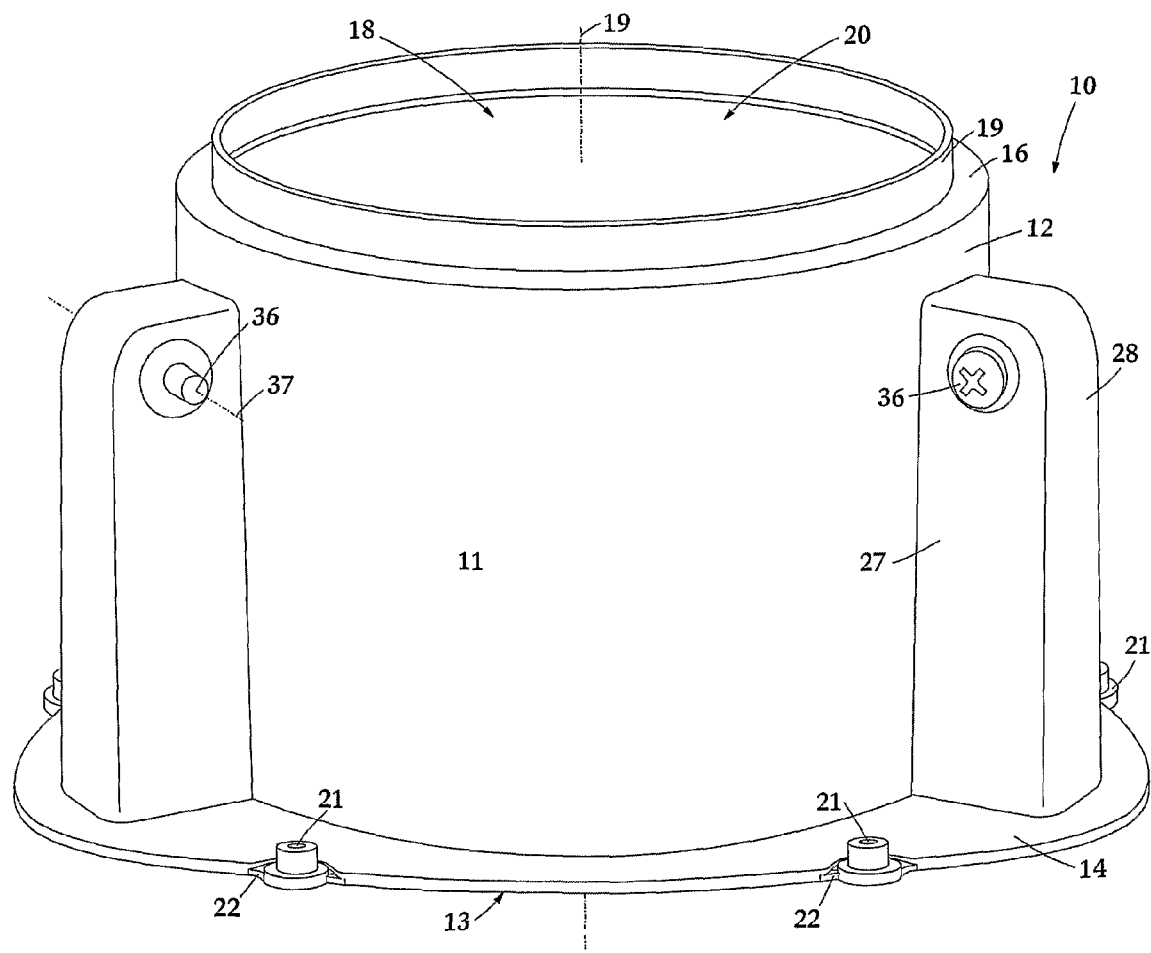
FIG. 1 is a pictorial representation of a fire collar according to the invention.
Figure 2:
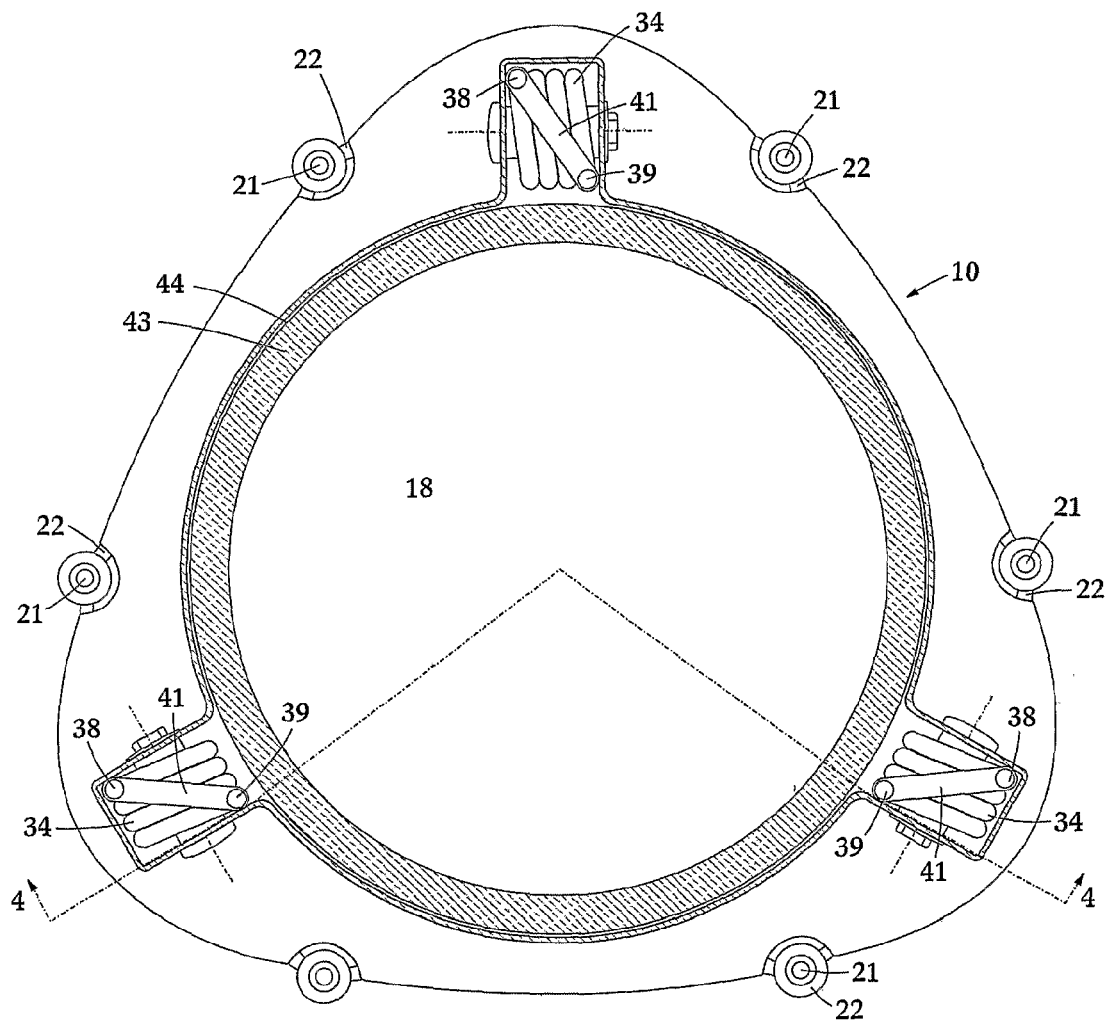
FIG. 2 is an elevation of the fire collar of FIG. 1 from one end in a loaded (or non-operating) position.
Figure 3:
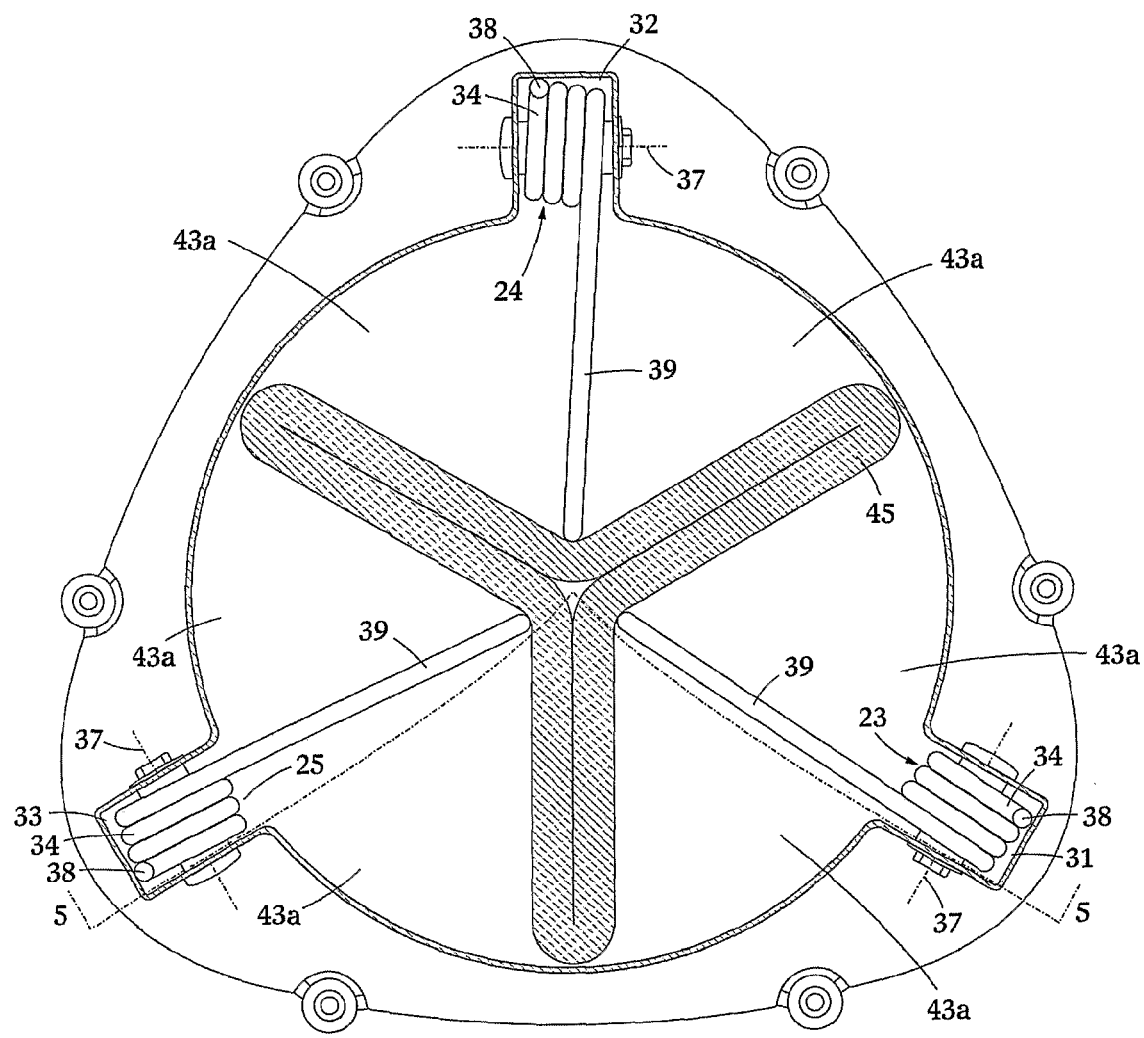
FIG. 3 is an elevation of the fire collar of FIG. 1 from the same end as in FIG. 3 in a released (or operating) position.
Figure 4:
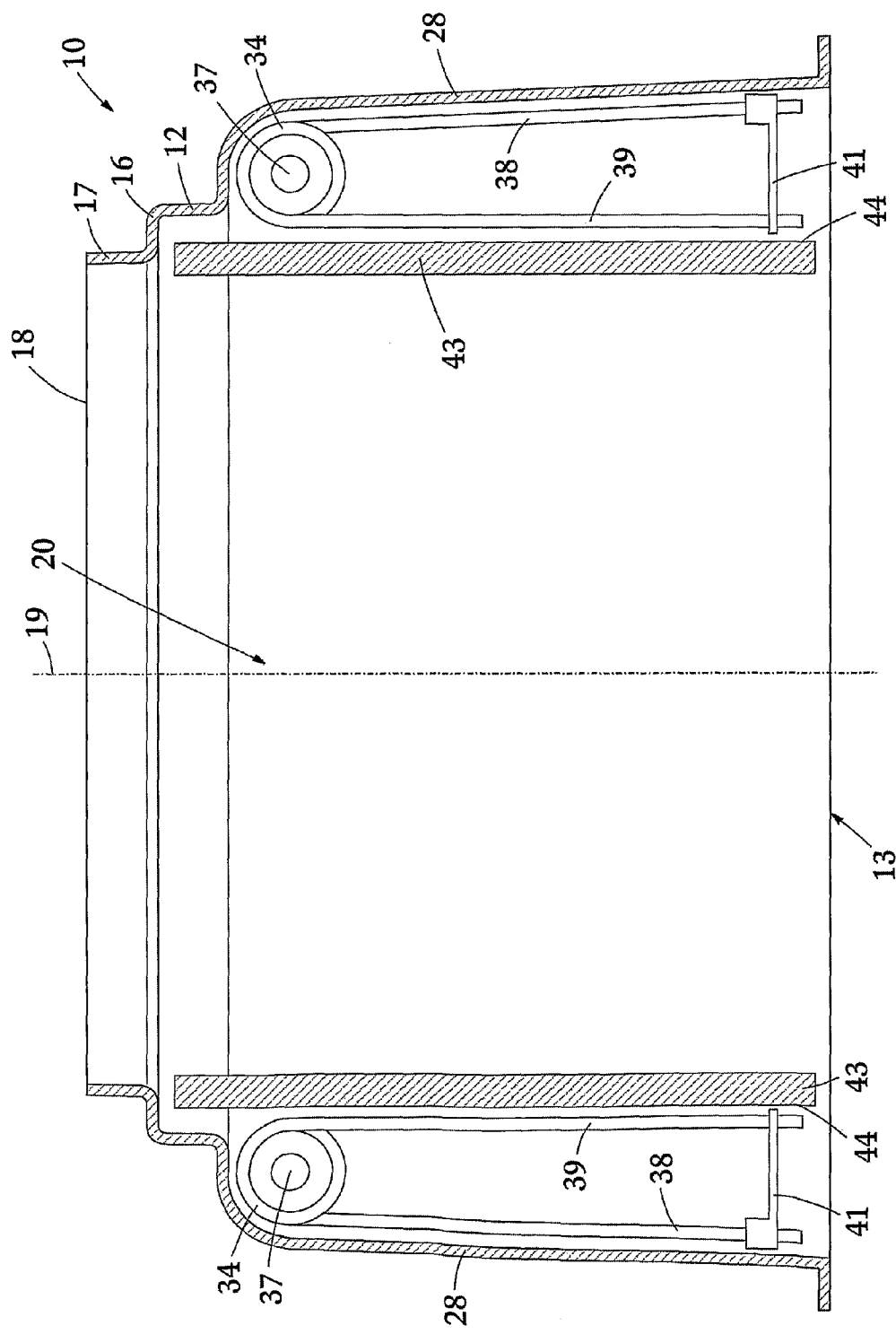
FIG. 4 is cross-sectional side elevation of the fire collar of FIG. 1 along line 4-4 in the loaded position.

The fire collar 10 illustrated in FIGS. 1 to 4 includes a housing 11 constructed of a plastics material and has a generally cylindrical side wall 12 which defines a bottom opening 13 and terminates in an outwardly extending bottom flange 14 at one end contiguous with the side wall and an inwardly extending top flange 16 at its upper end also contiguous with the side wall which terminates in a cylindrical guide ring 17 defining a top opening 18 adapted to receive therethrough a typical 100 mm PVC sewer pipe or ventilation duct (not shown). Suitably, the top and bottom openings are coaxial with the cylindrical wall along axis 19, and the cylindrical wall tapers slightly inwards towards the top opening forming a slightly expanding passage 20 therebetween.

The bottom flange is adapted to rest against a sheet of concrete formwork and be secured thereto so that a concrete wall or floor can be poured around the housing. A plurality of screw holes 21 are provided around the flange for securing the housing to the formwork. Advantageously, the holes are provided in frangible portions 22 of the flange which break off upon removal of the form work and remain therewith.

Figure 5:
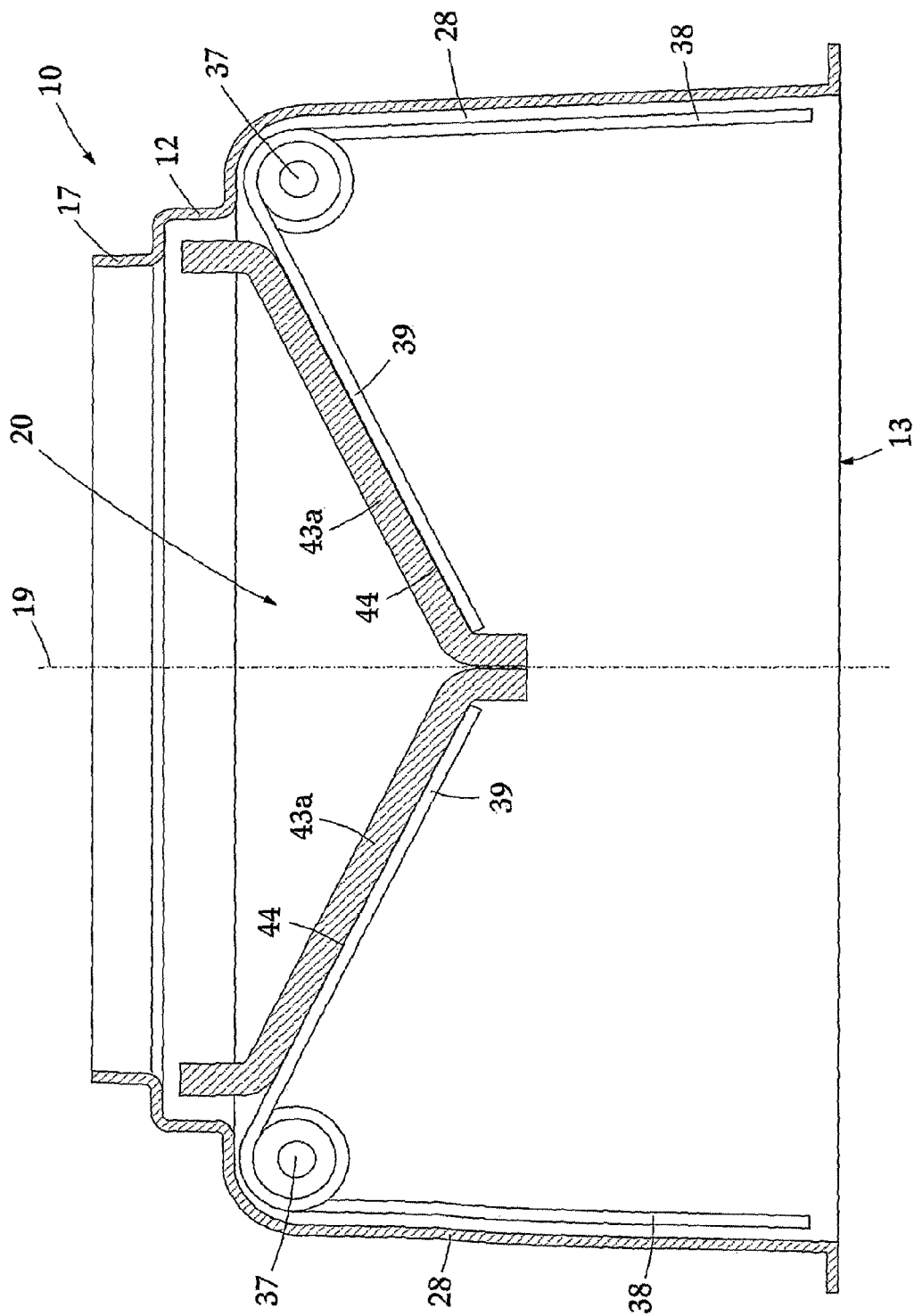
FIG. 5 is cross-sectional side elevation of the fire collar of FIG. 1 along line 5-5 in the loaded position.

Three elongate generally rectangular openings 23, 24 and 25 are provided in the side wall and two spaced apart radial walls 26 and 27 and a planar outer wall 28 parallel to the side wall 12 (although the outer wall can be concentric with the side wall if desired) extend outwardly therefrom to define equi-angularly spaced recesses 31, 32 and 33. Each recess houses therein a torsion spring 34 which is retained by a pin 36 extending through the recess and being secured in the spaced apart radial walls on the spring axis 37. The opposed tails 38 and 39 of the spring are held together in the loaded position by a fusible link 41 as can be seen in FIG. 5.

A layer of intumescent material of known type, typically neoprene based or high density polypropylene, formed into a cylinder 43 and enclosed by a layer of stainless steel gauze 44, is fitted within the housing adjacent the inner face of the cylindrical wall 12. The cylinder formed by the intumescent material and the gauze also tapers slightly inwards towards the top opening to more easily allow a PVC duct or pipe to be fitted therethrough from the bottom so that the intumescent material forms a sleeve thereabout. In this particular embodiment, the intumescent material and the surrounding gauze is secured to the wall 12 near its upper end (that is near the flange 16) by a plurality of spaced apart staples. However, in other embodiments the intumescent material is held purely by friction between it, the gauze and the housing.

In the event of a fire in sufficient proximity to the fire collar, the ambient air increases in temperature and causes the fusible link 41 to soften and break under the spring force of the torsion spring 34 (or alternatively it melts) where upon the spring is released and the outer tail 38 bears against the outer wall 28 of the spring housing and the inner tail 39 bears against the gauze and through the gauze the intumescent material, thereby forcing the gauze and the intumescent material encased thereby inwards towards the axis 19 so that it obstructs the passage 20. It will be appreciated that the PVC duct or pipe passing through the passage will have softened coincidentally and may have even burned to an extent allowing the torsion spring tail 39 to crush it inwards while forcing the intumescent material shown as 43a into the passage or at least into engagement with the crushed pipe as shown as 45 in FIG. 3. It will also be appreciated that as the intumescent material increases in temperature, it will expand and fully close the passage 20 thereby preventing the egress of smoke and poisonous gases from the site of the fire.

Advantageously, the stainless steel gauze also assists the operation of the fire collar in directing expansion of the intumescent material inwards rather than outwards which in turn assists in forcing the collapse of the conduit or pipe therein. (In other embodiments, a layer of fibreglass cloth is used instead of stainless steel gauze.)

Figure 6:
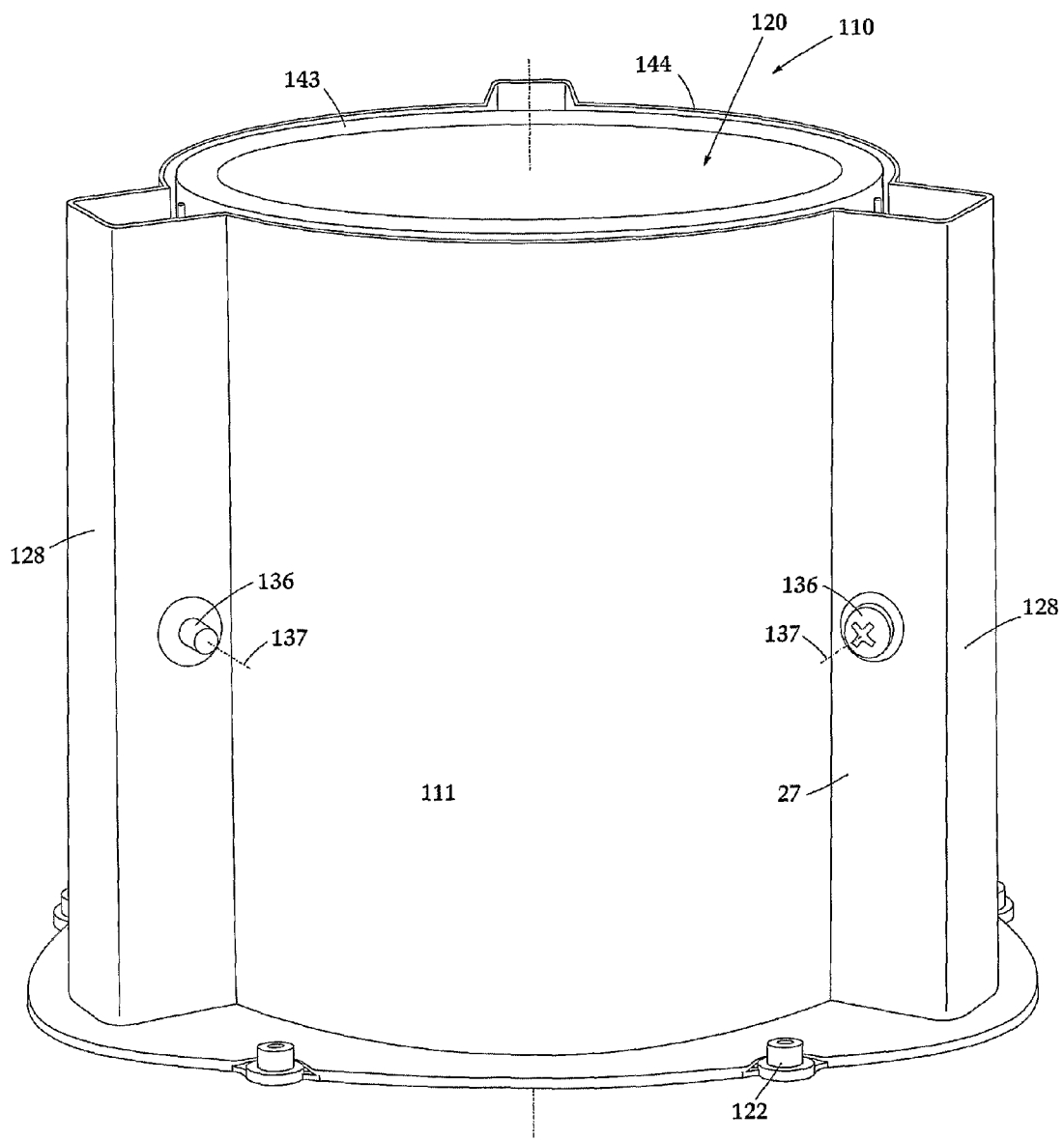
FIG. 6 is a pictorial representation of another fire collar according to the invention.
Figure 7:
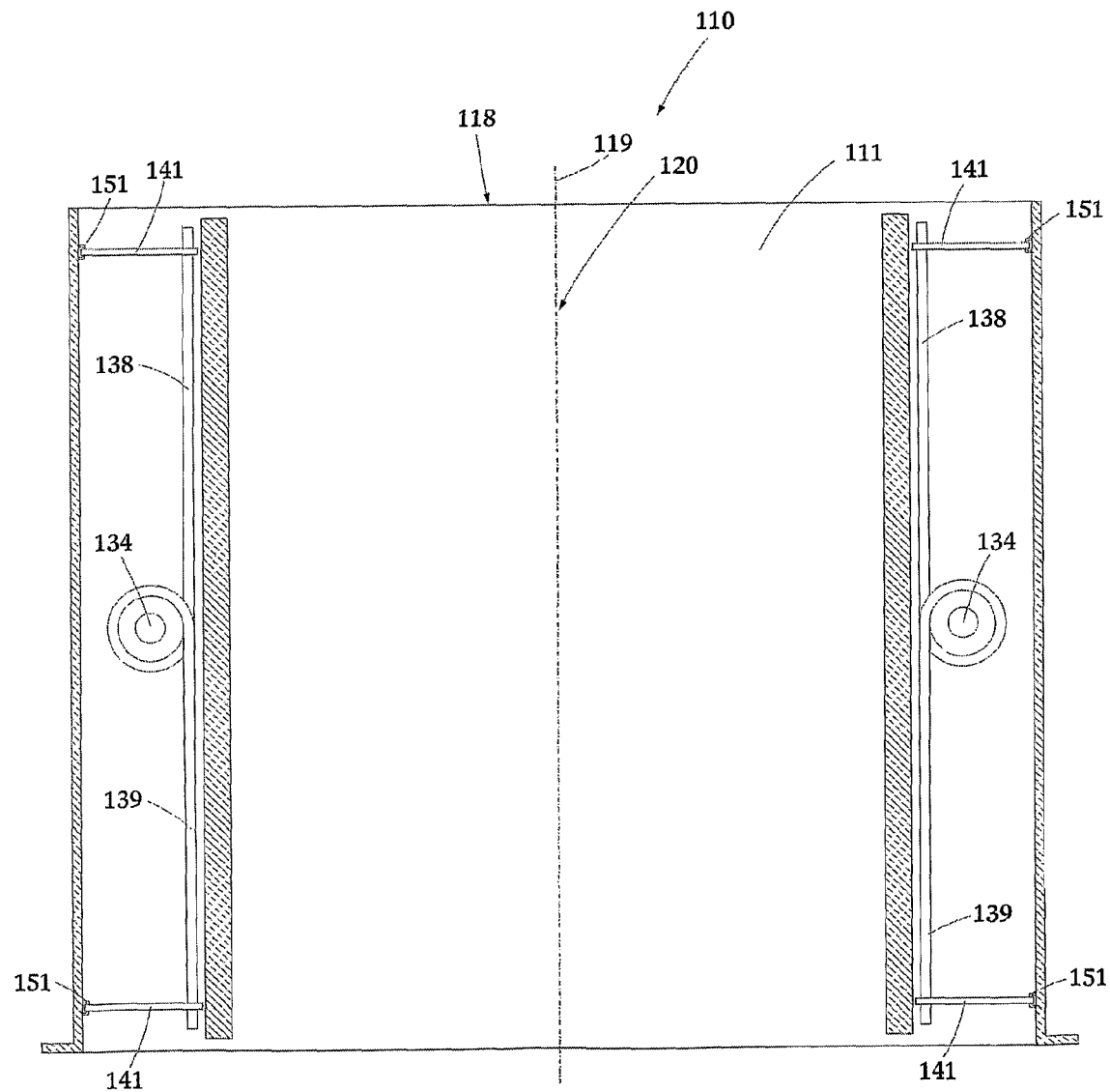
FIG. 7 is a cross-sectional elevation of the fire collar of FIG. 6.

The fire collar 110 illustrated in FIG. 6 is similar to that shown in FIG. 1 and accordingly corresponding numbers are used to reference corresponding components except prefaced by a "1". The collar 110 is particularly suited for use in walls where high temperature air can be close to either side and includes a cylindrical housing 111 with a torsion spring 134 having its axis in a similar position to that of collar 10 but centrally of the cylinder of intumescent material and the tails 138 and 139 of the spring extend in opposite directions when in the loaded position adjacent the intumescent material and are retained there by respective fusible links 141 which are connected to the housing at eyelets 151 and move towards each other when in the operating position forcing the intumescent material inwards from either one end or both ends depending on whether one or both fusible links have been fused thus responding to high temperature on either one or both sides of a barrier.

Figure 8:
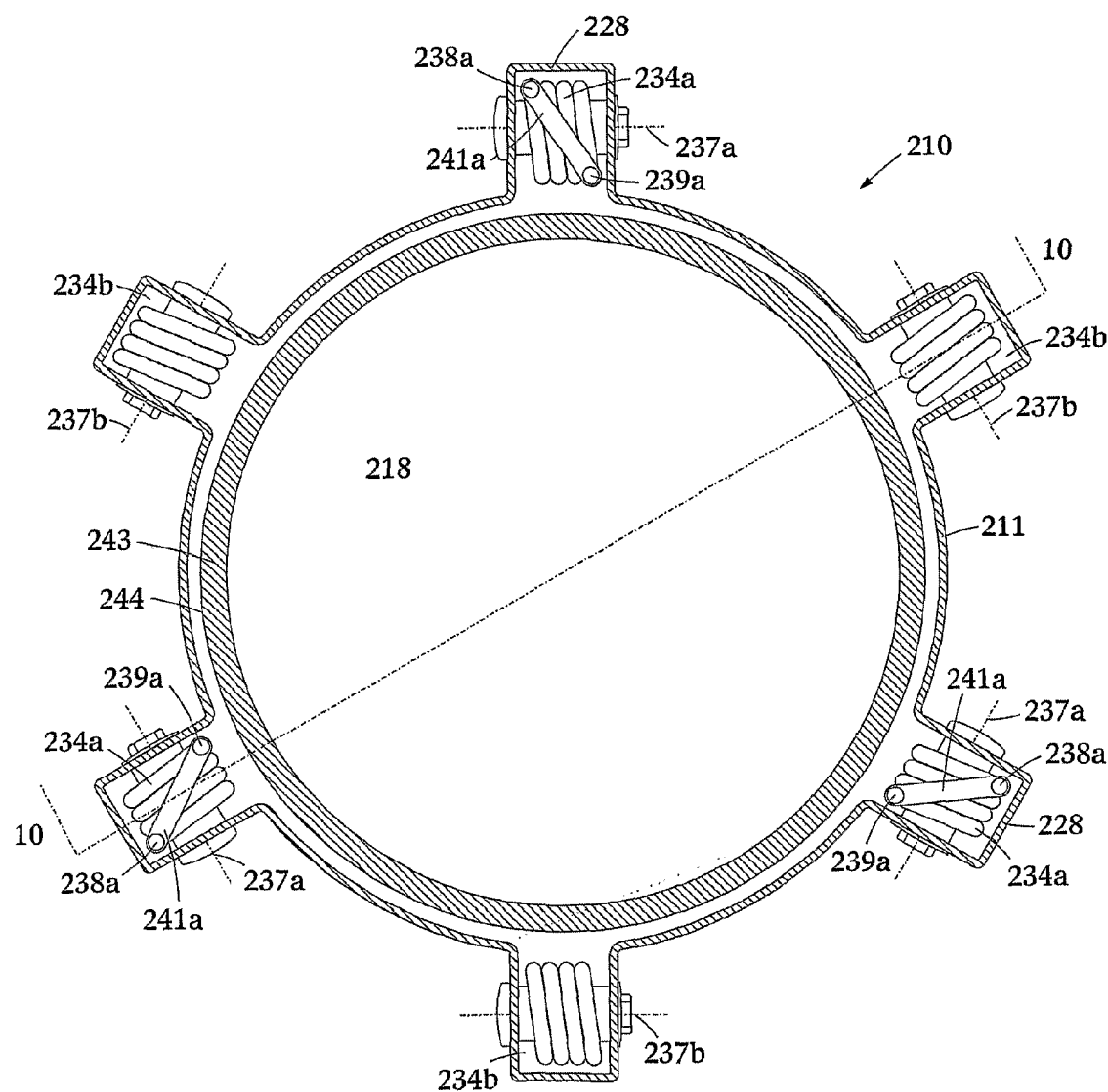
FIG. 8 is an elevation of another fire collar according to the invention from one end in a loaded (or non-operating) position.
Figure 9:
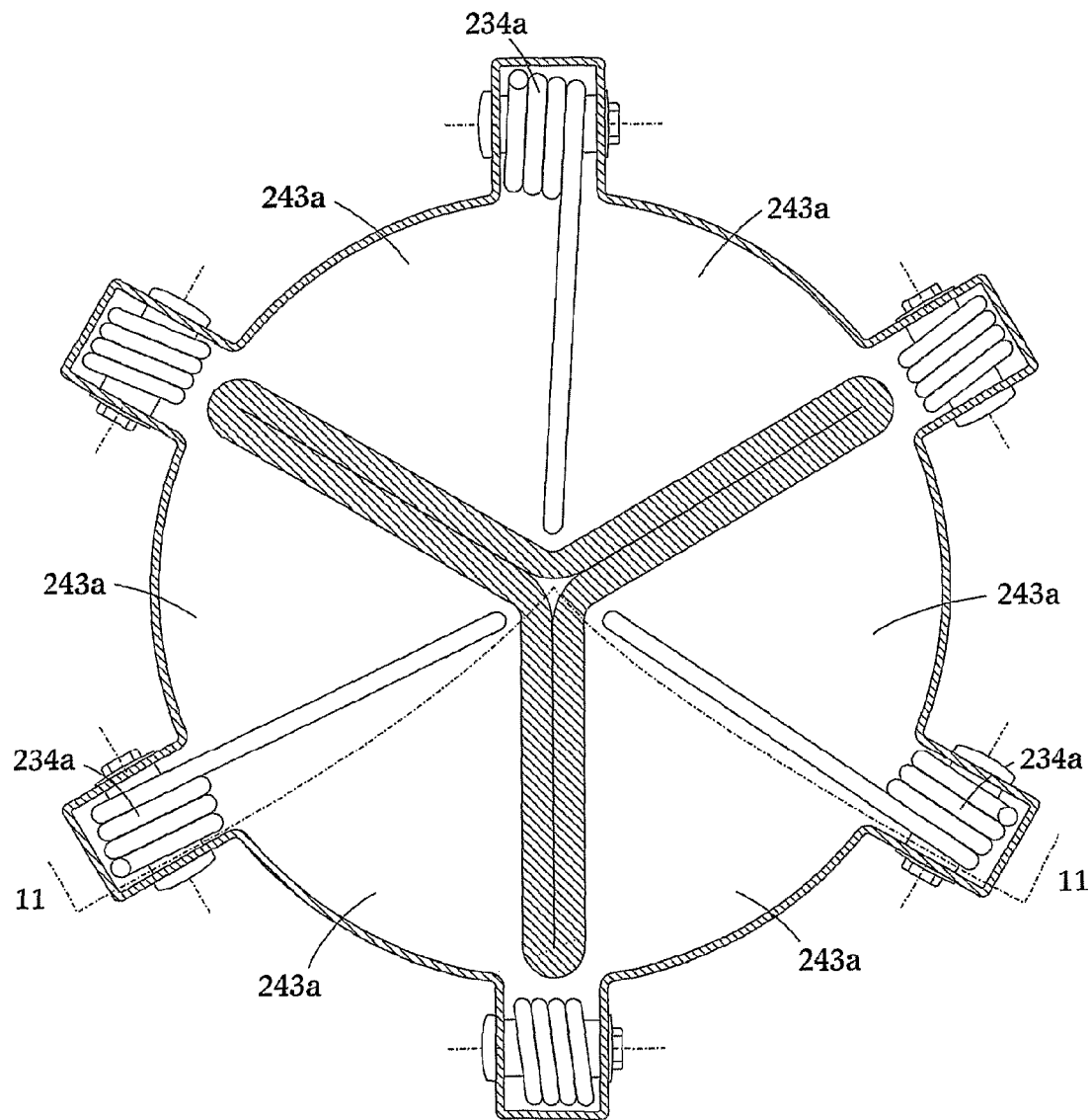
FIG. 9 is an elevation of the fire collar of FIG. 1 from the same end as in FIG. 9 in a released (or operating) position.
Figure 10:
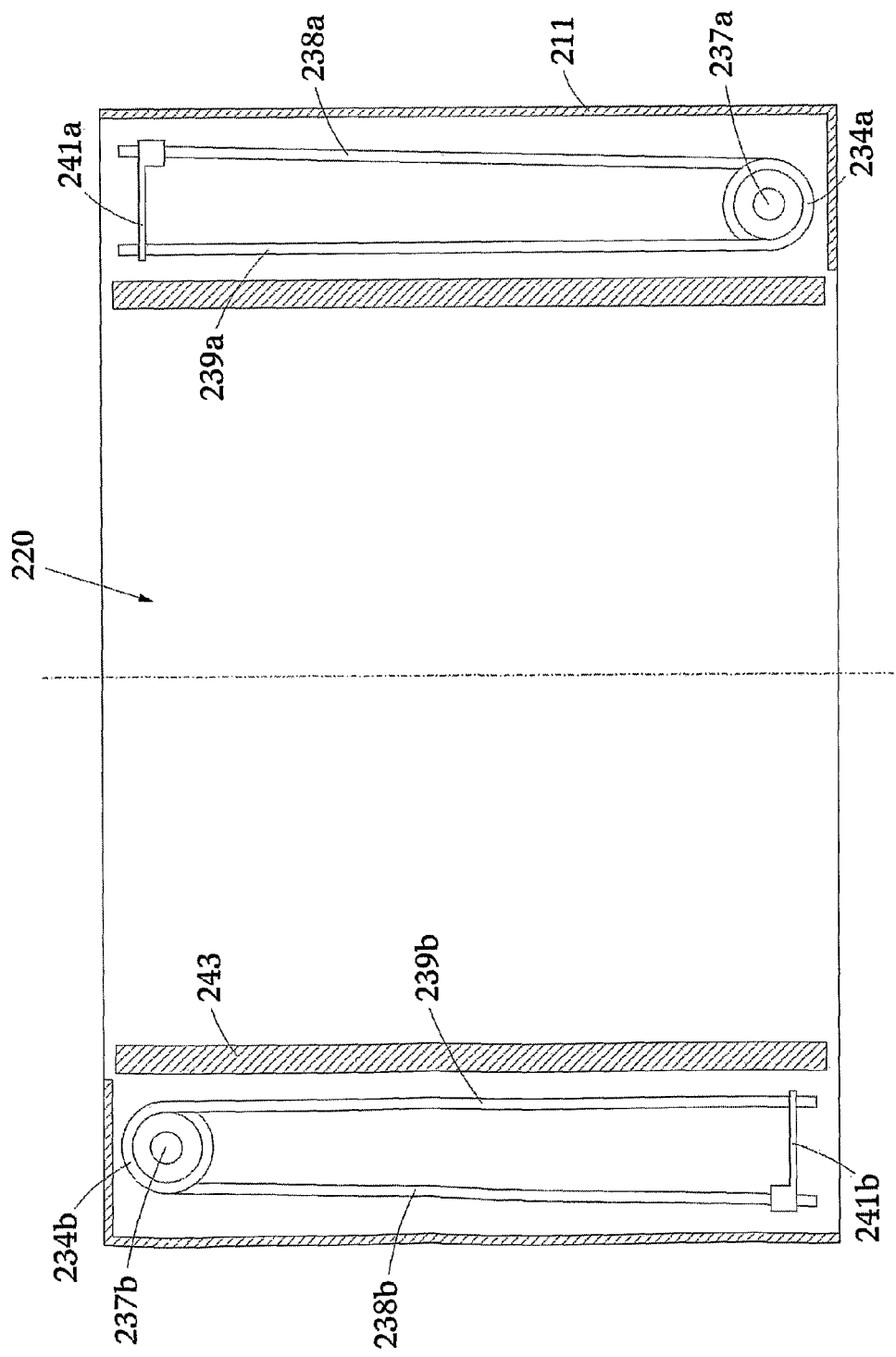
FIG. 10 is cross-sectional side elevation of the fire collar of FIG. 1 along line 10-10 in the loaded position.
Figure 11:
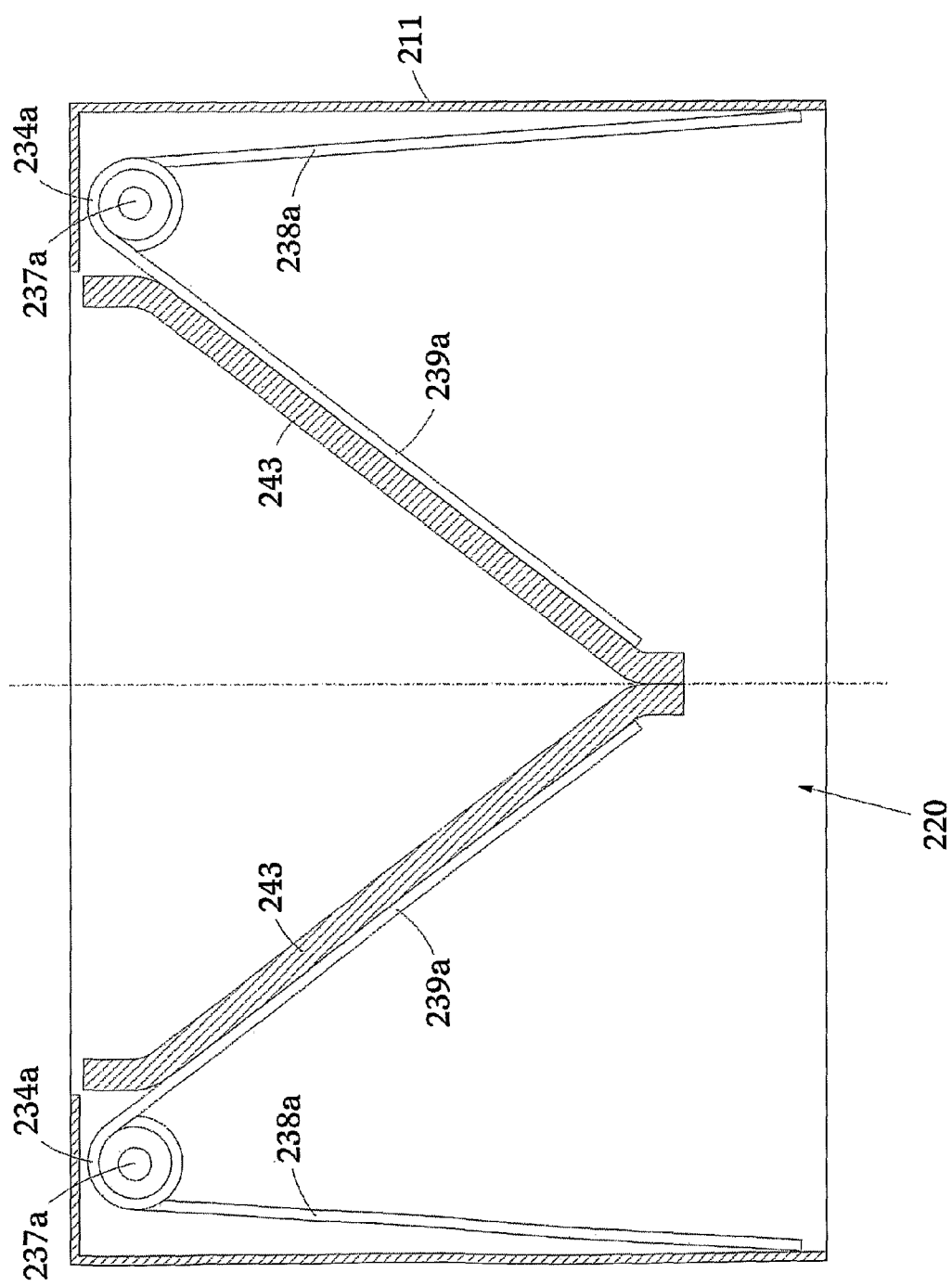
FIG. 11 is cross-sectional side elevation of the fire collar of FIG. 1 along line 11-11 in the loaded position.

The fire collar 210 illustrated in FIG. 8 is also similar to that shown in FIG. 1 and accordingly corresponding numbers are used to reference corresponding components except prefaced by a "2". The collar 210 is also particularly suited for use in walls where high temperature air can be close to either side. The collar includes a cylindrical housing 211 which is similar in length to the housing 11 of collar 10 and considerably shorter than the housing 111 of collar 110. The main difference is that the collar includes six torsion springs instead of three and that one set of three alternate springs are arranged to collapse the layer of intumescent material from one end and the other set of three are arranged to collapse it from the other end so that it can close off a conduit in response to a fire on either side of a wall. The two sets of springs and associated components are referenced by the suffix "a" or "b" as the case may be. It will be seen more clearly in FIG. 10 that alternate torsion springs are mounted at opposite ends of the housing so that the contacting tails 239a or 239b can engage with the cylinder of intumescent material at opposite ends as required. In operation, a fire on one side of a wall will result in the fusible links 241a or 241b breaking, depending on which side, in response to a predetermined high temperature thus allowing one set of torsion springs to engage with the intumescent material (through the layer of stainless steel gauze) forcing it to crush the conduit and obstruct the passage 220 as can be seen in FIG. 11. The obstruction will also prevent the other set of fusible links reaching the predetermined temperature.

The foregoing description has been given by way of illustrative example of the invention and many modifications in variations which will be apparent to persons skilled in the art may be made without departing from the spirit and scope of the invention as defined by the appended claims.

The invention claimed is:

1. A fire collar including:
   a mounting defining an opening configured to receive a conduit therethrough, the opening having a longitudinal axis adapted to align with the longitudinal axis of the conduit;
   a layer of intumescent material supported by said mounting adjacent said opening;
   actuating means operatively connected to said mounting for movement from a non-operating mode proximal to said layer of intumescent material to an operating mode in which it moves in a longitudinal plane passing through said opening in the direction of said longitudinal axis so as to force at least a portion of said layer of intumescent material to at least partially obstruct said opening in response to an increase in ambient temperature to a predetermined value.

2. A fire collar according to claim 1, wherein said layer of intumescent material comprises:
   one or more segments of intumescent material arranged about said opening and supported at one end by said mounting.

3. The fire collar according to claim 1, wherein said mounting is a housing adapted to house the layer of intumescent material therein and to receive a conduit therethrough, and said layer of intumescent material is housed in said housing and adapted to at least partially form a sleeve about a conduit passing through said housing.

4. The fire collar according to claim 1, wherein said actuating means includes a contactor which is configured to engage the outer face of the layer of intumescent material.

5. The fire collar according to claim 4, wherein said contactor is configured to move in a plane substantially along the longitudinal axis of the conduit.

6. The fire collar according to claim 4, wherein said contactor is elongate in form and makes contact with the intumescent material over a substantial longitudinal distance relative to the conduit.

7. The fire collar according to claim 4, wherein said actuating means is a torsion spring which is mounted to the mounting, the torsion spring having a spring axis and at least one tail remote from said spring axis, the tail being restrained in the non-operating position by a fusible link and arranged to engage the layer of intumescent material and force it at least partially across the opening upon release of the fusible link.

8. The fire collar according to claim 7, wherein the spring axis of the torsion spring is parallel to a tangent to the outer surface of the conduit passing through the opening.

9. The fire collar according to claim 7, wherein said fusible link is formed from a plastic material which softens to a fusible state upon the ambient temperature reaching a predetermined increased temperature at which the spring causes it to break.

10. The fire collar according to claim 7, wherein said fusible link holds the tail of the spring in the compressed position.

11. The fire collar according to claim 1, further including a layer of protective material extending about the layer or segment of intumescent material.

12. The fire collar according to claim 1, wherein the layer of intumescent material is generally cylindrical in form and arranged and dimensioned to closely fit around the conduit which is to pass therethrough.

13. The fire collar according to claim 12, further including retaining means at one end for retaining the cylindrical layer of intumescent material at one end in position.

14. The fire collar according to claim 13, wherein the layer of intumescent material is secured to said mounting of said housing near one end and is free at the other end.

15. The fire collar according to claim 13, wherein said layer of intumescent material is constituted by a plurality of layers.

16. A fire collar adapted to be located in or against a barrier and having a passage therethrough and being adapted to respond to a fire by sealing said passage, said fire collar including actuation means located around said passage and having intumescent material between said actuation means and said passage, said actuation means being held in a first position by heat actuated holding means such that when a predetermined temperature is reached as a result of a fire, said actuation means is released and applies a force to said intumescent material having a component along the passage thereby pushing it towards the center of said passage to obstruct said passage.

17. A fire collar adapted to be set into a concrete barrier during a formation of the barrier, including:
  a housing having a passage or cavity configured to receive a conduit therethrough;
  a quantity of intumescent material in said housing adjacent said passage or cavity;
  one or more torsion springs adjacent said passage or cavity and configured to engage said intumescent material upon the ambient temperature reaching a predetermined level, said one or more torsion springs being arranged to apply a force to said intumescent material having a component along the passage or into the cavity.

* * * * *